May 18, 1948.  J. C. RHOADS  2,441,844
SEAL CONSTRUCTION
Filed Sept. 17, 1946   2 Sheets-Sheet 1
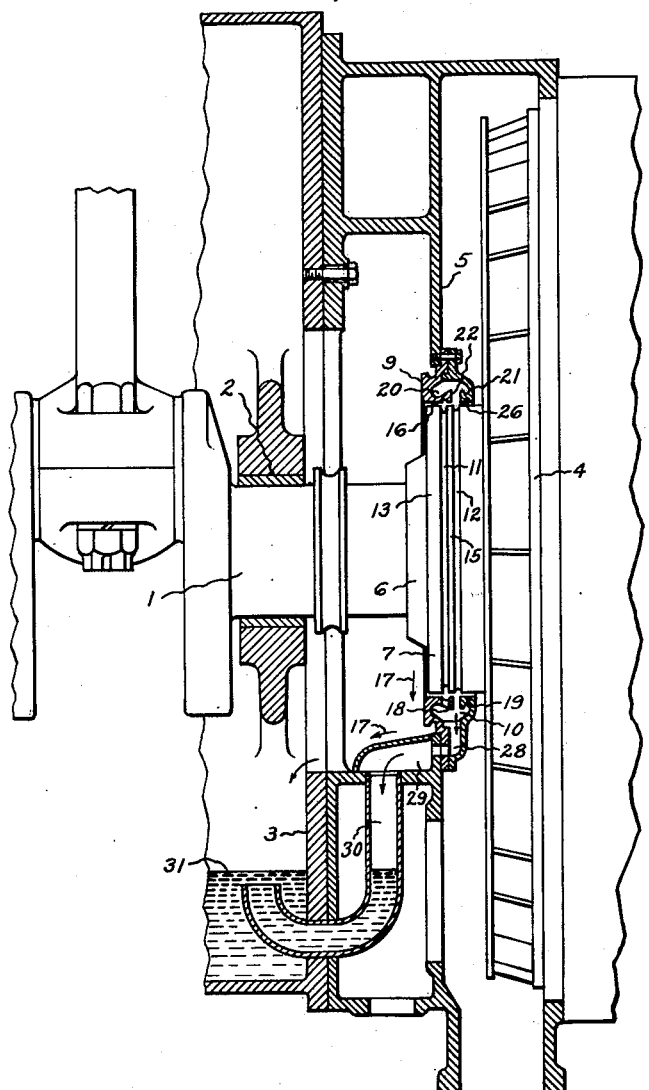
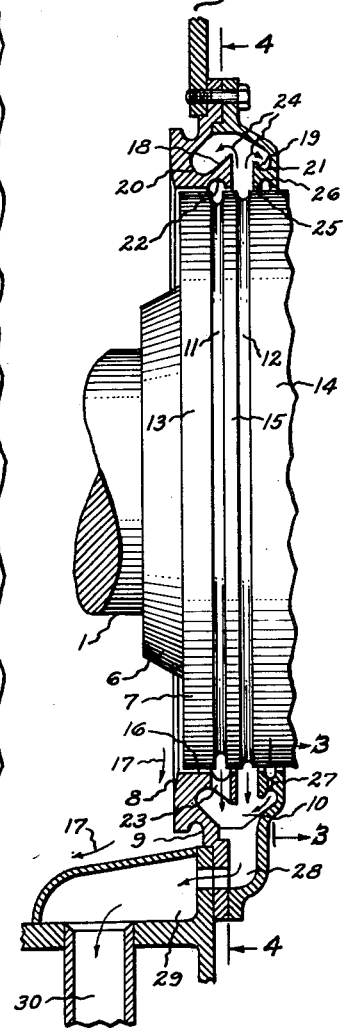
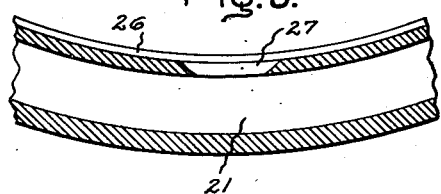
Inventor:
James C. Rhoads,
by *Prowell S. Mack*
His Attorney.

May 18, 1948.  J. C. RHOADS  2,441,844
SEAL CONSTRUCTION
Filed Sept. 17, 1946  2 Sheets-Sheet 2
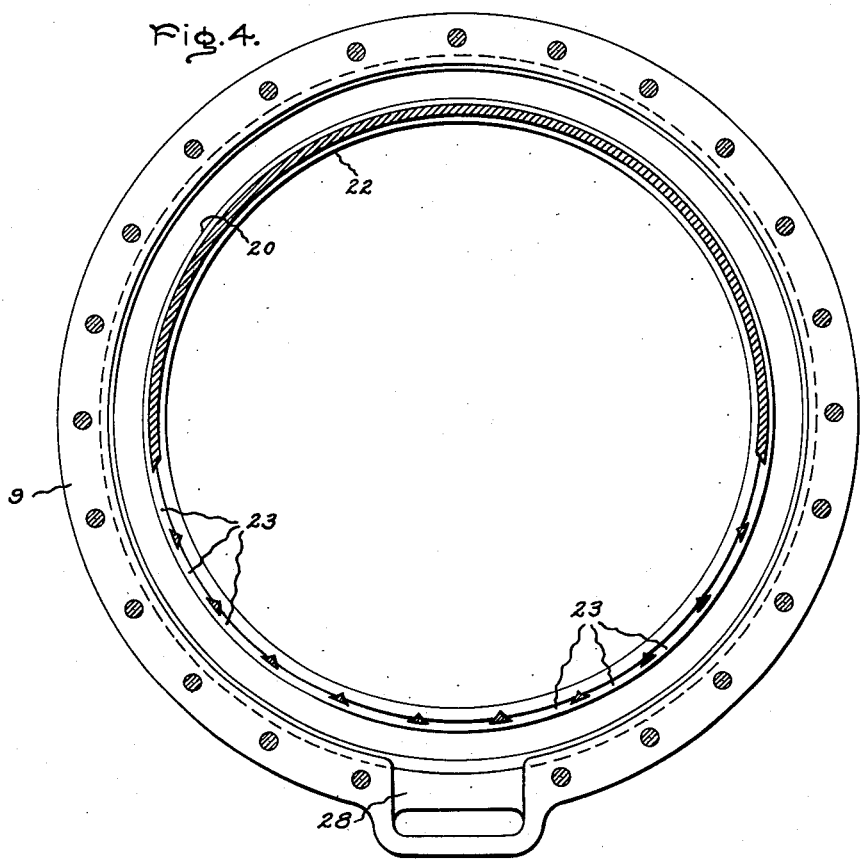
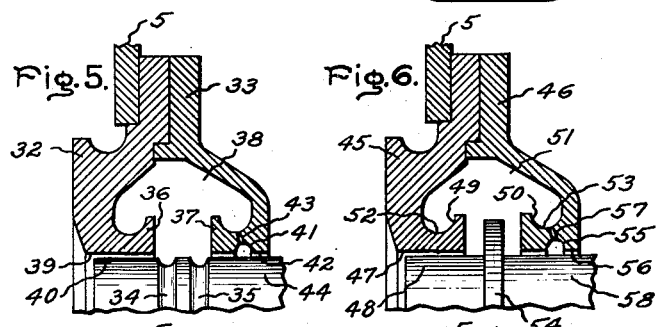
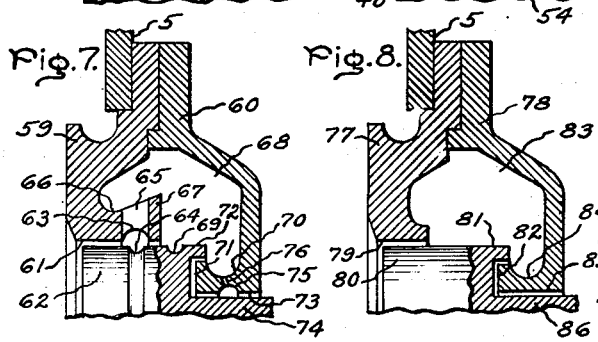
Inventor:
James C. Rhoads,
by Prowell S. Mack
His Attorney.

Patented May 18, 1948

2,441,844

UNITED STATES PATENT OFFICE 2,441,844

SEAL CONSTRUCTION

James C. Rhoads, Erie, Pa., assignor to General Electric Company, a corporation of New York Application September 17, 1946, Serial No. 698,844

4 Claims. (Cl. 286—5)

My invention relates to seals for rotatable members and particularly for minimizing the passage of oil and oil vapors from an engine crankcase into an electric generator or similar device adapted to be driven by the engine and mounted directly adjacent the engine crankcase.

An object of my invention is to provide an improved seal for a rotatable member extending through a wall and having a higher pressure on one side thereof and a relatively lower pressure on the other side thereof.

Another object of my invention is to provide an improved seal for minimizing the passage of vapor-laden gases from one compartment into another along a rotatable member which extends between these compartments through an opening in a wall separating the two compartments.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawings, Fig. 1 is a side elevational view, partly in section and partly broken away, illustrating one embodiment of my improved seal applied to an engine which is adapted to drive an electric generator; Fig. 2 is an enlarged sectional view of a part of a seal shown in Fig. 1; Fig. 3 is a sectional view taken along line 3—3 of Fig. 2; Fig. 4 is a sectional view taken along line 4—4 of Fig. 2; Fig. 5 is a partial sectional view illustrating another embodiment of my improved seal; Fig. 6 is a partial sectional view illustrating a further embodiment of my improved seal; Fig. 7 is a partial sectional view of a still further embodiment of my invention; and Fig. 8 is a partial sectional view of still another modification of my invention.

Referring to the drawings, Figs. 1, 2, 3, and 4 illustrate in general the arrangement of an embodiment of my invention as applied to a seal for minimizing the passage of oil-vapor laden gases from the crankcase of an engine, such as a Diesel engine, into the housing of an electric generator adapted to be driven by the engine. This same general construction is one to which the various modifications shown in Figs. 5 to 8, inclusive, also may be applied, and the general features shown in these figures are applicable to these further modifications of my invention as shown in Figs. 1 to 4, inclusive. In many applications where an engine is utilized to drive a generator, as in Diesel-electric locomotives, the electric generator is coupled directly to the crankshaft of the engine and the ventilating fan for the generator generally is arranged adjacent the engine in order to draw relatively clean air through the generator and to exhaust it from the end of the generator housing near the engine. With such an arrangement, a chamber or compartment at a relatively low pressure is formed on the generator side of the coupling, while the pressure on the engine crankcase side is at a relatively higher pressure. This can result in an undesirable passage of oil-vapor laden air or gas from the engine crankcase into the generator, which might result in clogging of the ventilating passages in the generator by the adherence of foreign particles to oil deposits in such passages and also might result in the destruction of certain types of insulation which may be used in the generator. It, therefore, becomes desirable to provide some sealing arrangement for preventing or minimizing the passage of oil-vapor laden air and gas from the engine crankcase into the generator housing. A number of arrangements have been tried, and it has been found that a fluid seal provides a most effective arrangement for preventing the flow of vapor laden air and gas between the engine crankcase and the generator housing in such a construction. Furthermore, I have found that my improved seal construction can utilize the lubricating oil of the engine to provide the desirable fluid seal.

In a construction of this type in which an engine having a suitable crankshaft 1 supported in bearings 2 in an engine crankcase 3 is arranged to drive a generator rotatable member having a ventilating fan 4 mounted thereon adjacent the engine crankcase 3, I have found it particularly effective to provide my improved seal adjacent the ventilating fan 4 and around the rotatable member where it projects through a separating wall 5 of the generator housing between the relatively higher pressure engine crankcase side thereof and the relatively lower pressure on the generator side thereof. In the arrangement shown in Figs. 1 to 4, inclusive, the seal includes a substantially cylindrical portion on the rotatable member which extends through an opening through the stationary member wall 5 around which the stationary portion of the seal is arranged to cooperate with the rotatable member cylindrical portion for effectively preventing the passage of vapor laden air from one side of the wall 5 to the other. In this construction, lubricating oil passes along the crankshaft 1 towards the rotatable member of the generator and is thrown outwardly under centrifugal force by an outwardly extending flange 6 formed on the engine crankshaft on the crankcase side of the cylindrical portion which extends through the opening in the wall 5. This lubricating oil passes from the member 6 along the outward surface of the radial face 7 of the cylindrical portion of the rotatable member and also is thrown outwardly by the member 6 against the outer face 8 of a stationary seal member 9 which forms one side of a labyrinth drain chamber 10 which extends circumferentially around the rotatable member cylindrical portion. This cylindrical portion of the rotatable member is formed with a pair of axially spaced circumferentially extending peripheral grooves 11 and 12 which act as flingers for oil which passes along the cylindrical surface of the rotatable member portion and are located such that a cylindrical portion extends to each side of these grooves and also between these grooves, as indicated at 13, 14, and 15, respectively. The stationary wall 9 of the labyrinth drain chamber 10 is formed with an inwardly extending cylindrical surface portion 16 having a small clearance with the rotatable member cylindrical portion 13 on the higher pressure side of the seal for metering the flow of lubricating oil into the seal, thereby limiting to a relatively small amount the flow of the lubricating oil which forms the fluid seal; while the remainder of the lubricating oil which impinges on the surface of the clearance between the walls 13 and 16 passes outwardly, as indicated by the arrows 17 and returns directly into the crankcase 3 of the engine. This flow of a small quantity of lubricating oil over the surface 16 prevents the passage of oil-vapor laden gases along the surface of the cylindrical portion of the rotatable member. It is desirable, however, that this oil must be removed from the rotatable member before it passes into the relatively low pressure side of the compartment around the generator rotatable member, and, therefore, the stationary member seal labyrinth drain chamber is formed with a pair of axially spaced flange lips 18 and 19 which extend outwardly into the labyrinth chamber and are each formed with lubricating oil collecting troughs 20 and 21. These troughs 20 and 21 collect and drain lubricating oil which may be thrown off by the rotatable member into the labyrinth chamber and direct the collected lubricating oil into the lower portion of the chamber, from which it may be suitably drained. In order to assure the removal of lubricating oil from this seal, the stationary member portion 9 is formed with a circumferentially extending lubricating oil drainage groove 22 therein adjacent one of the rotatable member grooves 11 with a small cylindrical portion extending axially away from the high pressure side of the seal with a small clearance with the rotatable member cylindrical portion 15 between the rotatable member grooves 11 and 12. Thus, lubricating oil passing along the metered opening between the surfaces 16 and 13 will tend to be thrown off into the drainage groove 22 by the edges of the rotatable member groove 11 and collect in the lower portion of this groove, from which the collected lubricating oil may pass into the labyrinth chamber 10 through a plurality of outwardly extending openings 23 formed in the lower portion of the stationary member lip 18. The two lips 18 and 19 are spaced axially on either side of the rotatable member groove 12 to provide a circumferentially extending opening around this groove permitting any lubricating oil which may pass the grooves 11 and 22 along the rotatable member cylindrical surface 15 to be flung outwardly by the edges of the rotatable member groove 12 directly into the labyrinth chamber 10, as indicated by the arrows 24, from which it is collected in the drain grooves 20 and 21 and returned to the lower portion of the labyrinth drain chamber 10. The second lip 19 is arranged on the side of the second rotatable member groove 12 away from the stationary member lip 18 and also is formed with a cylindrical portion 25 having a small clearance around the rotatable member cylindrical portion 14 to minimize any further passage of oil along the rotatable member. In the construction shown in these figures, an additional drainage and oil scraping groove 26 is formed in the cylindrical surface 25 of the lip 19 for draining any excess lubricating oil from the rotatable member and effectively preventing further passage of oil through the clearance between the cylindrical surfaces 14 and 25. Oil which may be collected in this drain groove 26 is returned to the labyrinth drain chamber 10 through an outwardly extending opening 27 formed in the lower portion thereof, as is more clearly shown in Figs. 2 and 3. The lubricating oil which passes through the seal into the labyrinth chamber 10 is drained from this chamber through a passage 28 into a passageway 29, from which it passes through a conduit 30 and is returned into the lubricating oil crankcase reservoir at a point below the normal lubricating oil level, as indicated at 31 in this crankcase reservoir. This arrangement for the return of the lubricating oil from the labyrinth chamber 10 into the crankcase reservoir 3 assures against the return passage of lubricating oil vapors through the drain into the seal, from which it might pass into the generator housing. It has been found that this very simple liquid seal effectively prevents the passage of oil-vapor laden gases from an engine crankcase into a generator housing and minimizes the possibility of "blow through" due to the higher pressure on the crankcase side of the seal.

In Fig. 5, I have shown another modification of my invention in which the seal is formed of a pair of stationary members 32 and 33 similar to those shown in Figs. 1 to 4, inclusive, which are adapted to be supplied with lubricating oil, as explained with respect to Figs. 1 and 2. In this construction, the rotatable member cylindrical surface which extends through the seal is formed with a pair of grooves 34 and 35, but these grooves are both arranged between the outwardly extending flange lips 36 and 37 of the stationary portion of the seal. As in the arrangement shown in Fig. 1, the lips 36 and 37 extend into a labyrinth drain chamber 38 formed between the stationary seal walls 32 and 33 and are adapted to collect lubricant which is flung outwardly into the chamber 38 and to direct this collected lubricant towards the lower portion of the labyrinth drain chamber 38, from which it is suitably returned to the crankcase lubricating oil reservoir. In this construction, a small clearance is formed between the stationary member inner cylindrical wall 39 and the cylindrical surface 40 on the rotatable member on the high pressure side of the seal in order to meter the quantity of lubricating oil which forms the liquid sealing medium which passes between these two surfaces. While most of the sealing oil will be thrown into the drain chamber 38 by the edges of the grooves 34 and 35, a drainage groove 41 is formed in a cylindrical surface 42 on the inner periphery of the lip 37 to assure removal of any oil remaining on the rotatable member. Passages 43 extend outwardly from the groove 41 into the labyrinth drain chamber 38 to provide for the draining of lubricant from the groove 41 into the labyrinth chamber. In order further to prevent the passage of sealing oil from the seal, the cylindrical surface 42 on the inner side of the lip 37 is formed with a relatively small clearance with the adjacent cylindrical surface 44 of the rotatable member.

In Fig. 6, I have shown a further modification of my invention in which the stationary member seal is formed with a pair of members 45 and 46, as in the construction shown in Figs. 1 to 4, inclusive, which are adapted to seal the rotatable member against the passage of oil-vapor laden gases from the high pressure side of the seal to the relatively low pressure generator side thereof. As in the construction shown in Figs. 1 to 4, these stationary seal members 45 to 46 are mounted on a separating wall 5 extending between the engine and the generator, and the high pressure side wall member 45 is formed with a cylindrical portion 47 having a relatively small clearance with a cylindrical surface 48 of the rotatable member between which lubricating oil from the engine crankcase, or other suitable supply, is adapted to be splashed or sprayed to form a thin liquid seal between these cylindrical surfaces for minimizing the passage of gas therethrough. In this arrangement, the stationary seal wall members 46 and 47 are formed with outwardly extending lips 49 and 50 which extend into a labyrinth chamber 51 formed between the members 46 and 47. These lips form lubricating oil collecting troughs 52 and 53 which are adapted to collect and drain lubricating oil which may be thrown directly into the chamber 51 from the rotatable member and to drain this lubricating oil into the lower portion of the chamber, from which it is returned to the lubricating oil reservoir. In this construction, the flinging of lubricating oil from the rotatable member into the chamber 51 is assured by the provision of a collar 54 formed on the rotatable member and extending into a circumferentially extending opening between the axially spaced lips 49 and 50. Further passage of lubricating oil along the rotatable member in the form of small particles is minimized by the provision of a drainage groove 55 formed in an inner cylindrical surface 56 of the lip 50 adapted to remove any lubricating oil remaining on the rotatable member. This lubricating oil is then drained through outwardly extending passages 57 into the lubricating oil collecting trough 53, from which it is directed into the lower portion of the labyrinth drain chamber 51, as in the construction illustrated in Figs. 1 and 2. In addition, the cylindrical surface 56 on the inner side of the lip 50 is formed with a relatively small clearance about a cylindrical surface 58 on the rotatable member to prevent further passage of oil along this surface.

In Fig. 7 I have shown an additional modification of my improved seal construction in which the stationary seal is formed by a pair of members 59 and 60 which are adapted to be secured to a wall 5, as in the arrangement shown in Figs. 1 and 2, and these two stationary seal members are arranged around a substantially cylindrical portion of the rotatable member with which they are adapted to form an effective liquid seal against the passage of lubricating oil laden vapors therethrough. In this construction, the stationary seal member 59 is formed with a cylindrical surface 61 having a relatively small clearance with a cylindrical surface 62 of the rotatable member to provide for the metering of the passage of a limited amount of lubricating oil between these cylindrical surfaces, as explained with respect to Figs. 1 and 2. This stationary seal member 59 is formed with a drain groove 63 in the cylindrical surface 61 thereof to drain a certain amount of the lubricating oil from between the two cylindrical surfaces 61 and 62, and a flinger groove 64 is formed in the rotatable member cylindrical surface 62 to throw off oil into the drain groove 63. This drained lubricating oil is adapted to be returned to the lubricant reservoir by passing from the drain groove 63 through outwardly extending passages 65 into a collecting trough 66 formed by an outwardly extending lip 67 on the stationary seal member 59. The collecting trough 66 drains the lubricating oil which passes thereinto into a labyrinth drain chamber 68 formed between the stationary seal members 59 and 60. In order further to assure against the passage of lubricating oil along the rotatable member, this rotatable member is formed with a second flinger groove 69 which is adapted to throw lubricating oil outwardly directly into the labyrinth drain chamber 68, from which it may be suitably collected and drained to the lubricant reservoir by the collecting trough 66 and by a second collecting trough 70 formed by a second outwardly extending flange lip 71 formed on the stationary seal member 60 and extending circumferentially around the rotatable member. Furthermore, the rotatable member is formed with a flinger lip 72 which extends circumferentially therearound and over an end of the lip 71. This flinger lip 72 is adapted to throw off additional oil which may pass along the surface of the rotatable member and the lip 71 is formed with an inner cylindrical surface 73 with a close clearance with a cylindrical surface 74 on the rotatable member to minimize further the passage of any additional small lubricating oil particles which may pass along the rotatable member. In addition, a second drain groove 75 is formed in the lip surface 73 for further draining any lubricating oil between the cylindrical surfaces 73 and 74, and this lubricating oil is drained from the drainage groove 75 through a passage 76 into the collecting trough from which it passes to the lower portion of the labyrinth chamber 68 and is returned to the lubricating oil reservoir, thus effectively preventing the passage of lubricating oil and lubricating oil fumes from the relatively higher pressure side of the seal adjacent the stationary sealing member 59 to the relatively lower pressure side of the seal adjacent the stationary sealing member 60.

An additional simplified sealing arrangement is shown in Fig. 8 in which a pair of stationary sealing members 77 and 78 are adapted to be mounted on a separating wall 5 similar to the arrangements shown in Figs. 1 and 2. In this construction, as in that shown in the former seals, the stationary sealing member 77 is formed with a cylindrical surface 79 arranged with a small clearance with a rotatable member cylindrical surface 80, and lubricating oil is adapted to be supplied to the space between these cylindrical surfaces in any suitable manner, such as that described with respect to Figs. 1 and 2. This lubricating oil provides an effective liquid seal between these surfaces to prevent the passage of oil-vapor laden gases through the seal. In this construction, the rotatable member is formed with an axially extending flinging lip 81 which extends over the outer edge of an outwardly extending lip 82 formed on the stationary sealing member 78 and extending outwardly into a labyrinth drain chamber 83 which extends circumferentially around the rotatable member and is formed between the stationary seal members 77 and 78. Lubricating oil which is flung outwardly by the lip 81 is drained by the tapering walls of the labyrinth chamber 83 and is collected in a collecting trough 84 formed by the lip 82 of the stationary member 78, from which the lubricating oil is drained into the lower portion of the labyrinth chamber 83 and is returned by any suitable means to a lubricant reservoir, such as that shown in Fig. 1. In order further to insure against the passage of lubricating oil through this seal the stationary seal member 78 is formed with a cylindrical surface 85 having a relatively small clearance with a rotatable member cylindrical surface 86 to minimize the passage of oil-laden gases between these two cylindrical surfaces.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A seal for a rotatable member extending through a wall having a higher pressure on one side thereof and a relatively lower pressure on the other side thereof, said seal comprising a pair of axially spaced peripheral grooves with a cylindrical portion extending to each side thereof and also between said grooves on a portion of said rotatable member, means for supplying and metering the flow of lubricating oil into said seal from the higher pressure side thereof, a stationary member having a labyrinth drain chamber extending around said rotatable member grooves, a flange lip on said stationary member extending into said labyrinth chamber and forming a lubricating oil collecting trough for collecting and draining lubricating oil thrown off by said rotatable member into said labyrinth chamber and for directing collected lubricating oil into the lower portion of said chamber, said flange lip extending over said rotatable member cylindrical portion and having a circumferentially extending lubricating oil drainage groove therein with a cylindrical portion extending axially away from said higher pressure side with a small clearance with said rotatable member cylindrical portion, means including an opening in the lower portion of said stationary member lip extending from said drainage groove into said labyrinth chamber for draining lubricating oil from said groove into said chamber, a stationary member cylindrical portion extending axially with a small clearance around said rotatable member cylindrical portion on the lower pressure side of said seal for minimizing passage of lubricating oil from said seal, a lubricating oil reservoir, and means for draining lubricating oil from said labyrinth chamber into said lubricating oil reservoir.

2. A seal for a rotatable member extending between a wall having a higher pressure on one side thereof and a relatively lower pressure on the other side thereof, said seal comprising a pair of axially spaced circumferentially extending peripheral grooves with cylindrical portions extending to each side thereof and between said grooves on a portion of said rotatable member, a stationary sealing member including a cylindrical portion having a small clearance with said rotatable member cylindrical portion on the higher pressure side of said seal for metering the flow of lubricating oil into said seal, means for supplying lubricating oil into and over the outer edge of said clearance between said adjacent rotatable member and stationary member cylindrical portions, said stationary member having a labyrinth drain chamber extending circumferentially around said rotatable member grooves, a pair of axially spaced lips on said stationary member extending outwardly into said labyrinth chamber each forming a lubricating oil collecting trough for collecting and draining lubricating oil thrown off by said rotatable member into said labyrinth chamber and for directing collected lubricating oil into the lower portion of said chamber, a circumferential drain groove in each of said lips adjacent said rotatable member cylindrical portions, means for draining lubricating oil from said drain grooves into said labyrinth chamber, said stationary member having a cylindrical portion extending axially with a small clearance around said rotatable member cylindrical portion on the lower pressure side of said seal for minimizing passage of lubricating oil from said seal, a lubricating oil reservoir, and means for draining lubricating oil from said labyrinth chamber into said lubricating oil reservoir to a point below the normal level of lubricating oil in said reservoir.

3. A seal for a rotatable member extending between a wall having a higher pressure on one side thereof and a relatively lower pressure on the other side thereof, said seal comprising a pair of axially spaced peripheral grooves with a cylindrical portion extending to each side thereof and also between said grooves on a portion of said rotatable member, means for metering the flow of lubricating oil into said seal, a stationary member having a labyrinth drain chamber extending around said rotatable member grooves, a flange lip on said stationary member extending outwardly into said labyrinth chamber and forming a lubricating oil collecting trough for collecting and draining lubricating oil thrown off by said rotatable member into said labyrinth chamber and for directing the collected lubricating oil into the lower portion of said chamber, said flange lip extending over one of said rotatable member grooves and having a circumferentially extending lubricating oil drainage groove therein adjacent said one rotatable member groove with a cylindrical portion extending axially away from said high pressure side with a small clearance with said rotatable member cylindrical portion between said rotatable member grooves, means including an opening in the lower portion of said stationary member lip extending from said drainage groove into said labyrinth chamber for draining lubricating oil from said groove into said chamber, a second lip on said stationary member spaced axially from said first-mentioned lip and arranged on the side of said second rotatable member groove away from said first-mentioned lip providing a circumferentially extending opening between said lips over said second rotatable member groove to provide for direct flinging of lubricating oil from said rotatable member into said labyrinth chamber, said second lip extending outwardly into said labyrinth chamber and providing a second lubricating oil collecting trough for collecting lubricating oil thrown into said labyrinth chamber and directing such collected lubricating oil into the lower portion of said chamber, said second lip having a cylindrical portion extending axially with a small clearance around said rotatable member cylindrical portion on the low pressure side of said seal and being formed with a second drainage groove therein extending circumferentially around said rotatable member for draining excess lubricating oil from said rotatable member and minimizing the passage thereof from said seal, means for draining lubricant from said second lip groove into said labyrinth chamber, a lubricating oil reservoir on the high pressure side of said seal, and means for draining lubricating oil from said labyrinth chamber into said lubricating oil reservoir to a point below the normal level of lubricating oil in said reservoir.

4. A seal for a rotatable member extending between a wall having a higher pressure on one side thereof and a relatively lower pressure on the other side thereof, said seal comprising a pair of axially spaced circumferentially extending peripheral grooves with a cylindrical portion extending to each side thereof and also between said grooves on a portion of said rotatable member, a stationary sealing member including a cylindrical portion having a small clearance with said rotatable member cylindrical portion on the higher pressure side of said seal for metering the flow of lubricant into said seal, means for supplying lubricating oil over the outer edge of said clearance between said adjacent rotatable member and stationary member cylindrical portions, a labyrinth drain chamber in said stationary member extending circumferentially around said rotatable member grooves, a flange lip on said stationary member extending outwardly into said labyrinth chamber and forming a lubricant collecting trough for collecting and draining lubricant thrown off by said rotatable member into said labyrinth chamber and for directing the collected lubricant into the lower portion of said chamber, said flange lip extending over one of said rotatable member grooves and having a circumferentially extending lubricant drainage groove therein adjacent said one rotatable member groove with a cylindrical portion extending axially away from said high pressure side with a small clearance with said rotatable member cylindrical portion between said rotatable member grooves, means including a plurality of openings in at least the power portion of said stationary member lip extending outwardly from said drainage groove into said labyrinth chamber for draining lubricant from said groove into said chamber, a second lip on said stationary member spaced axially from first-mentioned lip and arranged on the side of said second rotatable member groove away from said first-mentioned lip providing a circumferentially extending opening between said lips over said second rotatable member groove to provide for direct flinging of lubricant from said rotatable member into said labyrinth chamber, said second lip extending outwardly into said labyrinth chamber and providing a second lubricant collecting trough for collecting lubricant thrown into said labyrinth chamber and directing such collected lubricant into the lower portion of said chamber, said second lip having a cylindrical portion extending axially with a small clearance around said rotatable member cylindrical portion on the low pressure side of said rotatable member second groove and being formed with a second drainage groove therein extending circumferentially around said rotatable member for draining excess lubricant from said rotatable member and minimizing the passage thereof from said seal, means including an opening extending through said second lip from said second drainage groove into said labyrinth chamber for draining lubricant from said second lip groove into said labyrinth chamber, a crankcase lubricant reservoir on the high pressure side of said seal, and means for draining lubricant from said labyrinth chamber into said lubricant reservoir to a point below the normal level of lubricant in said reservoir.

JAMES C. RHOADS.

REFERENCES CITED

The following references are of record in the file of this patent:

UNITED STATES PATENTS

| Number | Name | Date |
| --- | --- | --- |
| 1,001,687 | Richards | Aug. 29, 1911 |
| 1,561,076 | Heitman et al. | Nov. 10, 1925 |
| 1,621,751 | Pruger | Mar. 22, 1927 |
| 1,640,463 | McFarland | Aug. 30, 1927 |